(12) United States Patent
Awatsu et al.

(10) Patent No.: US 8,327,151 B2
(45) Date of Patent: Dec. 4, 2012

(54) BIOMETRICS AUTHENTICATION METHOD AND BIOMETRICS AUTHENTICATION SYSTEM

(75) Inventors: Kiyotaka Awatsu, Inagi (JP); Masanori Ohkoshi, Inagi (JP); Takahiro Kudoh, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1007 days.

(21) Appl. No.: 11/337,555

(22) Filed: Jan. 24, 2006

(65) Prior Publication Data

US 2007/0003111 A1    Jan. 4, 2007

(30) Foreign Application Priority Data

Jun. 30, 2005    (JP) .................................. 2005-193127

(51) Int. Cl.
*H04L 29/06* (2006.01)

(52) U.S. Cl. ................ 713/186; 713/185; 726/4; 726/5; 726/6; 726/7; 382/115

(58) Field of Classification Search .................. 713/186, 713/168, 172, 182, 185, 193; 382/115; 340/5.82; 705/18; 726/2, 3, 4, 5, 6, 7, 9, 17, 18, 19, 726/26, 27, 28, 29, 30; 380/247, 248, 249; 455/419, 426.1
See application file for complete search history.

(56) References Cited

U.S. PATENT DOCUMENTS

| | | | | |
|---|---|---|---|---|
| 5,131,038 A | * | 7/1992 | Puhl et al. | 340/5.61 |
| 5,943,624 A | * | 8/1999 | Fox et al. | 455/556.1 |
| 6,041,412 A | * | 3/2000 | Timson et al. | 726/3 |
| 6,657,538 B1 | | 12/2003 | Ritter | |
| 6,819,219 B1 | * | 11/2004 | Bolle et al. | 340/5.52 |
| 6,976,171 B1 | * | 12/2005 | Ritter et al. | 713/193 |
| 7,120,606 B1 | * | 10/2006 | Ranzini et al. | 705/64 |
| 7,325,724 B2 | * | 2/2008 | Bonalle et al. | 235/380 |
| 2001/0026632 A1 | * | 10/2001 | Tamai | 382/116 |
| 2002/0130764 A1 | * | 9/2002 | Hayakawa | 340/5.82 |
| 2002/0139861 A1 | * | 10/2002 | Matsumoto et al. | 235/492 |
| 2002/0174348 A1 | * | 11/2002 | Ting | 713/186 |

(Continued)

FOREIGN PATENT DOCUMENTS

CN        1249048 A        3/2000
(Continued)

OTHER PUBLICATIONS

Office Action mailed on Mar. 13, 2009 issued in a corresponding Chinese patent application No. 200610008008.8, with English translation.

(Continued)

*Primary Examiner* — Eleni Shiferaw
*Assistant Examiner* — Hilary Branske
(74) *Attorney, Agent, or Firm* — Westerman, Hattori, Daniels & Adrian, LLP

(57) ABSTRACT

A biometrics authentication system uses biometrics authentication media to simplify the process of issuing biometrics authentication media, and reduce issuing costs. A biometrics authentication application is downloaded from a server to a mobile communication terminal, and an area for authenticated biometrics information is created. A user brings this mobile communication terminal to a service area and causes an image of his own biometrics information to be captured, and this biometrics data and an account number are stored in a common area of the mobile communication terminal. Therefore, the mobile communication terminal has functions of an individual card storing biometrics information, and issuing of a card for use in biometrics authentication is completed.

15 Claims, 11 Drawing Sheets

U.S. PATENT DOCUMENTS

| | | | |
|---|---|---|---|
| 2004/0052405 A1* | 3/2004 | Walfridsson | 382/115 |
| 2004/0260793 A1* | 12/2004 | Ichikawa et al. | 709/219 |
| 2005/0009564 A1* | 1/2005 | Hayaashi et al. | 455/558 |
| 2005/0050367 A1* | 3/2005 | Burger et al. | 713/202 |
| 2005/0086497 A1* | 4/2005 | Nakayama | 713/185 |
| 2005/0114389 A1 | 5/2005 | Kamiya | |
| 2007/0181672 A1* | 8/2007 | Sawamura | 235/380 |

FOREIGN PATENT DOCUMENTS

| | | | |
|---|---|---|---|
| CN | 1514635 A | | 7/2004 |
| CN | 1622055 A | | 6/2005 |
| EP | 1271436 A2 | * | 1/2003 |
| EP | 1548582 A1 | * | 6/2005 |
| JP | 64-7253 | | 1/1989 |
| JP | 11-45364 | | 2/1999 |
| JP | 2001-067523 A | | 3/2001 |
| JP | 2002-342809 | | 11/2002 |

OTHER PUBLICATIONS

Second Notification of Office Action, dated Sep. 11, 2009, in corresponding Chinese Patent Application No. 200610008008.8.

Ryuuichi Maede; "A Whole of Newest high technology mobile telephone FeliCA, A mobile telephone mounted non-contact IC is now moving"; JAVA Press, vol. 41, published by Gizyutu Hyouron, Apr. 15, 2005, pp. 182-191.

Japanese Office Action dated Dec. 7, 2010, issued in corresponding Japanese Patent Application No. 2005-193127. (w/partial English translation).

Japanese Office Action dated Apr. 5, 2011, issued in corresponding Japanese Patent Application No. 2005-193127.

Japanese Office Action dated Mar. 21, 2012, issued in corresponding Japanese Patent Application No. 2011-145464, (English translation, 6 pages).

* cited by examiner

BIOMETRICS AUTHENTICATION METHOD AND BIOMETRICS AUTHENTICATION SYSTEM

CROSS-REFERENCE TO RELATED APPLICATIONS

This application is based upon and claims the benefit of priority from the prior Japanese Patent Application No. 2005-193127, filed on Jun. 30, 2005, the entire contents of which are incorporated herein by reference.

BACKGROUND OF THE INVENTION

1. Field of the Invention

The present invention relates to a biometrics authentication method and biometrics authentication system to detect characteristics of the body and perform individual authentication, and in particular relates to a biometrics authentication method in which biometrics authentication functions are installed in a mobile communication device to perform biometrics authentication, and a biometrics authentication system which uses a mobile communication device.

2. Description of the Related Art

With advances in information processing technology in recent years, various illicit transactions using electronic data have become prominent. In particular, with the widespread practice of authentication of individuals using a card with a password, the relation between card data and passwords has become widely known, and there have been conspicuous instances of the illicit acquisition of card data and passwords, the damage resulting from which has been considerable.

As one method to resolve such problems with methods involving passwords, various technologies have been proposed for biometrics authentication utilizing characteristics of the human body. For example, methods employing fingerprints, the iris of the eye, facial features, blood vessel images (in the palm of the hand and the fingers), and similar have been proposed. In such biometrics authentication technologies, an individual's own biometrics characteristic data is registered on the individual's card. In order to employ biometrics authentication to enable transactions, a biometrics information reader provided in the transaction equipment which acquires biometrics information is used to acquire biometrics information for the individual, the acquired biometrics information is compared with the registered biometrics data on the individual's card, and depending on the comparison result, the transaction is permitted (see for example Japanese Patent Laid-open No. 2001-067523).

However, when using the technology of the prior art, various procedures are necessary to issue an individual card for biometrics authentication, from application by the user to issuing of the card, so that time is required. Further, when numerous individual cards for biometrics authentication are issued at a service area, security measures must be considered, entailing additional labor. And because issuing of an individual card is a burden placed on the issuing party, costs are incurred in issuing cards, and these costs have also acted to impede widespread adoption.

Thus although biometrics authentication technology is an extremely effective measure to prevent illicit transactions, the process for securely issuing identification cards is complex, and moreover costs are incurred when issuing cards, thus impeding widespread adoption.

SUMMARY OF THE INVENTION

Hence one object of this invention is to provide a biometrics authentication method and a biometrics authentication system using a mobile communication device, to simplify the process of issuing media which can be used in biometrics authentication methods, in realizing individual authentication based on biometrics authentication.

A further object of this invention is to provide a biometrics authentication method and a biometrics authentication system using a mobile communication device, to reduce the cost of issuing media which can be used in biometrics authentication methods, in realizing individual authentication based on biometrics authentication.

Still a further object of this invention is to provide a biometrics authentication method and a biometrics authentication system using a mobile communication device, to securely and immediately issue media which can be used in biometrics authentication methods.

In order to attain these objects, a biometrics authentication method of this invention has a step of accessing, from a mobile communication terminal having non contact communication functions and mobile communication functions, a server which manages a biometrics authentication application, via a mobile communication network; a step of downloading from the server to the mobile communication terminal the biometrics authentication application; a step of detecting biometrics characteristics of a user from the user of the mobile communication terminal; a step of communicating with the mobile communication terminal to which the biometrics authentication application has been downloaded, and writing the detected biometrics information to a storage area of the mobile communication terminal managed by the biometrics authentication application; and a step of communicating with a terminal which detects the biometrics information of the user in use of the contact-free communication functions of the mobile communication terminal, and of verifying biometrics information detected by the terminal against biometrics information written to the mobile communication terminal.

Further, a biometrics authentication system of this invention has a server, which is accessed via a mobile communication network by a mobile communication terminal having contact-free communication functions and mobile communication functions, and which downloads a biometrics authentication application to the mobile communication terminal; a registration terminal, which detects biometrics information of a user from the user of the mobile communication terminal, communicates with the mobile communication terminal to which the biometrics authentication application has been downloaded, and writes, in a storage area managed by the biometrics authentication application of the mobile communication terminal, the detected biometrics information; and a verification device, which detects biometrics information of the user, uses the contact-free communication functions of the mobile communication terminal for communication, and verifies the detected biometrics information against the biometrics information written to the mobile communication terminal.

Further, a biometrics authentication system of this invention has a mobile communication terminal, having contact-free communication functions and mobile communication functions, which accesses a server which manages a biometrics authentication application and downloads the biometrics authentication application; a biometrics information registration device, which detects biometrics information of the user of the mobile communication terminal from the user, communicates with the mobile communication terminal which has downloaded the biometrics authentication application, and writes, to a storage area managed by the biometrics authentication application of the mobile communication terminal, the detected biometrics information; and a terminal, which detects biometrics information of the user, utilizes the contact-free communication functions of the mobile communication terminal to perform communication, verifies the detected biometrics information against biometrics information written to the portable communication terminal, and performs biometrics authentication.

In this invention, it is preferable that the downloading step comprise a step of downloading both the biometrics authentication application, and specification of the storage area in the mobile communication terminal to be managed by the biometrics authentication application.

In this invention, it is preferable that the biometrics authentication method further have a step of creating an area for storage of the biometrics information in the mobile communication terminal after download, according to the specification of the storage area.

In this invention, it is preferable that the writing step has a step of writing the biometrics information and individual information of the user to enable use of biometrics authentication.

In this invention, it is preferable that the writing step has a step of writing the biometrics information and account information of the user to enable use of biometrics authentication.

In this invention, it is preferable that the downloading step has a step of downloading both the biometrics authentication application, and individual information of the user to enable use of biometrics authentication.

In this invention, it is preferable that the downloading step has a step of downloading both the biometrics authentication application, and account information of the user to enable use of biometrics authentication.

In this invention, it is preferable that the biometrics authentication method further have a step, when the verification is satisfactory, of using the contact-free communication functions of the mobile communication terminal to perform transaction processing at the terminal.

A biometrics authentication application is downloaded to a mobile communication terminal from a server, an area for authenticated biometrics information is created, the user's own biometrics information is captured in an image, and biometrics data (vein data) and an account number are stored in a common area of the mobile communication terminal. As a result, the mobile communication terminal has the functions of an individual card storing biometrics information, and the issuing of a media for biometrics authentication is completed. Consequently the process of issuing biometrics authentication media is simplified, and the cost of the issuing can be reduced.

DESCRIPTION OF THE PREFERRED EMBODIMENTS

Below, embodiments of the invention are explained in the order of a biometrics authentication system, processing for registration in a mobile communication device, processing during use of a mobile communication device, and other embodiments. However, this invention is not limited to these embodiments.

Biometrics Authentication System

Figure 1:
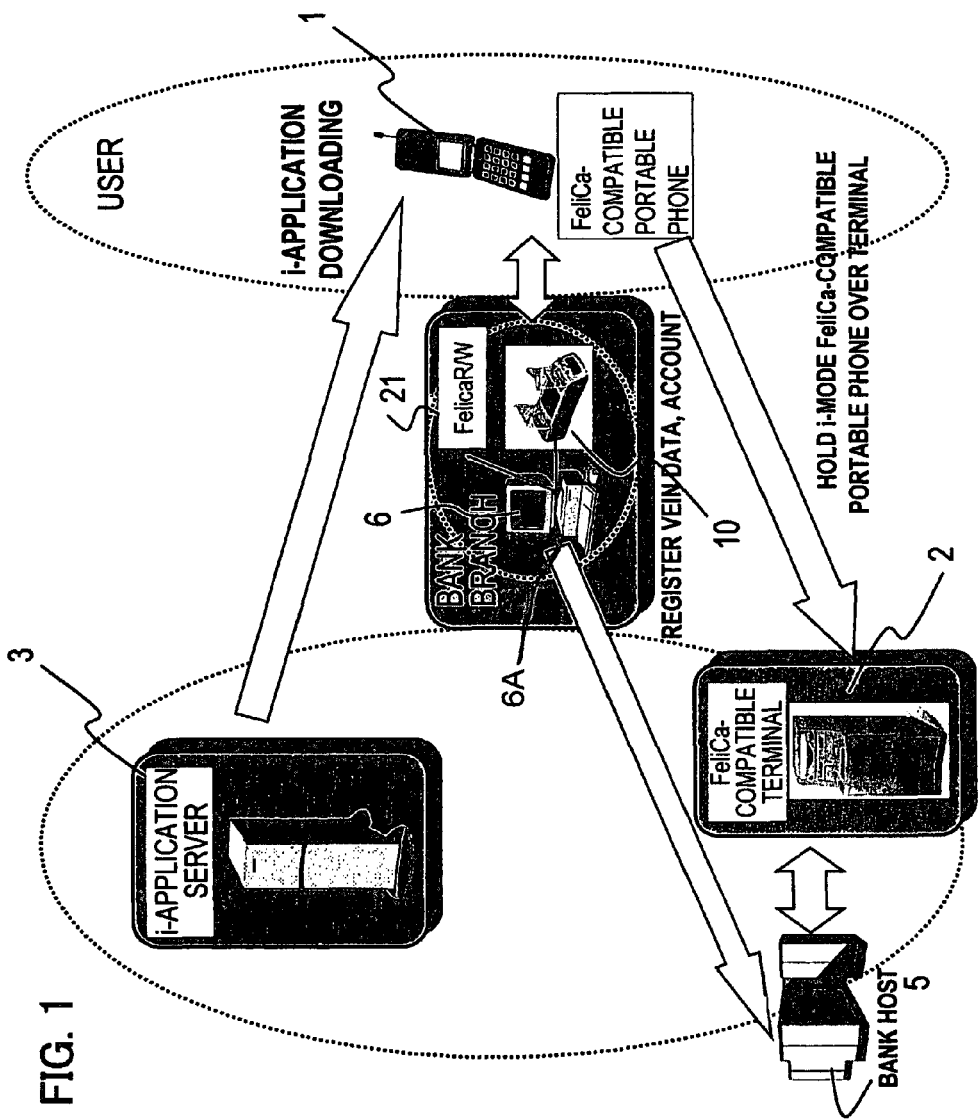
FIG. 1 shows the configuration of the biometrics authentication system in one embodiment of the invention.
Figure 2:
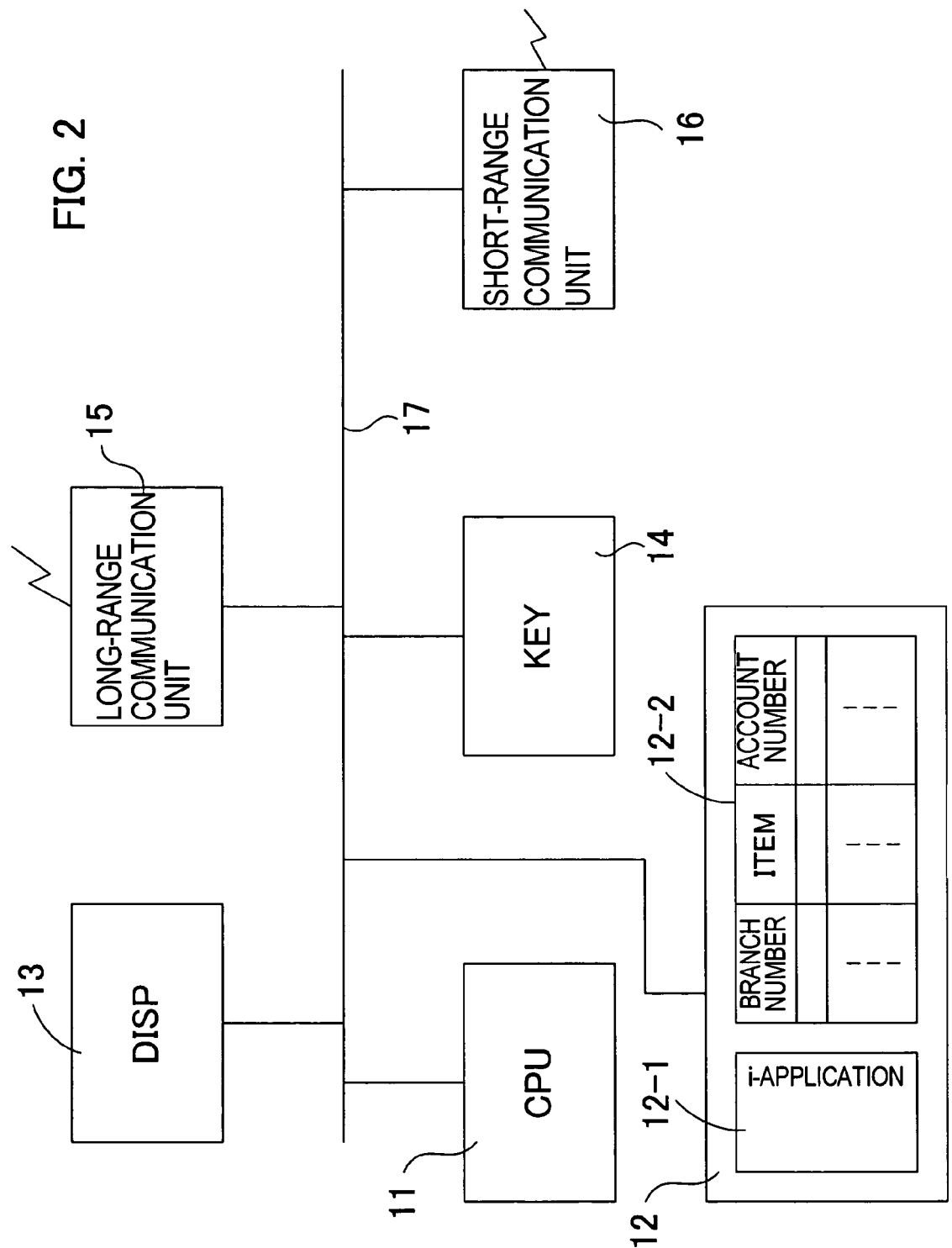
FIG. 2 shows the configuration of the mobile communication terminal of FIG. 1.
Figure 3:
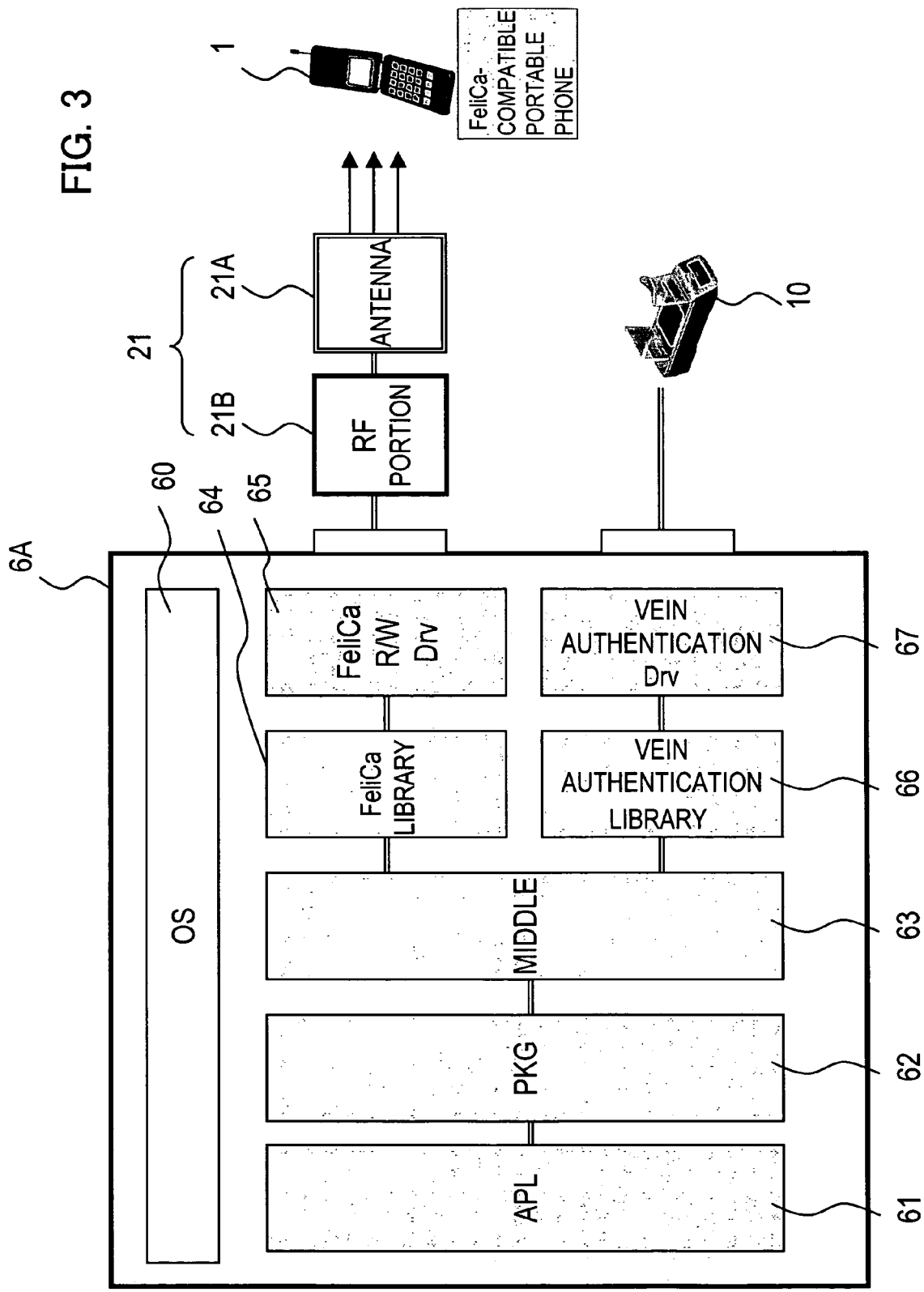
FIG. 3 is a block diagram of the service area terminal of FIG. 1.
Figure 4:
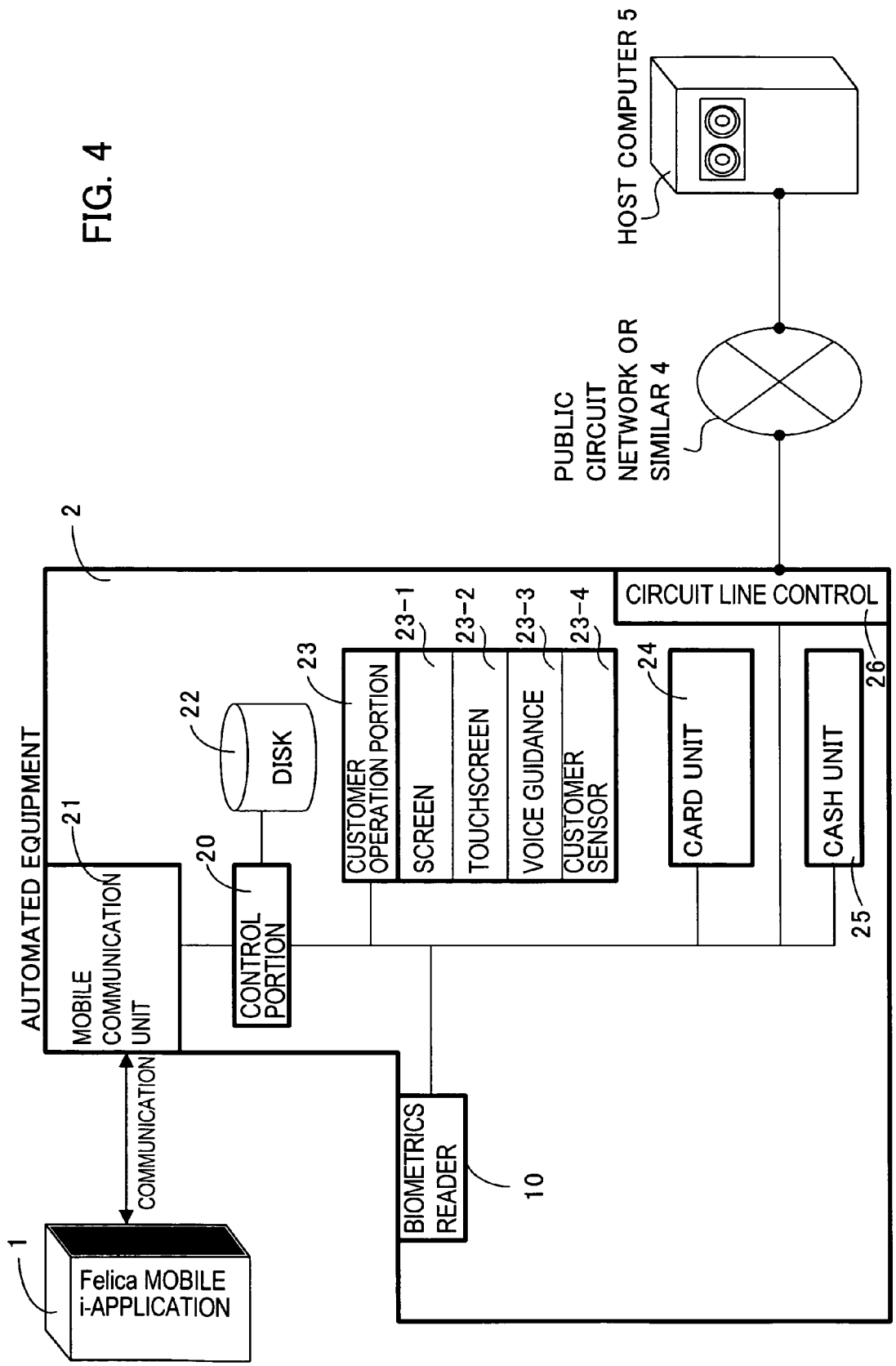
FIG. 4 is a block diagram of the automated transaction device of FIG. 1.

FIG. 1 shows the configuration of the biometrics authentication system of one embodiment of the invention; FIG. 2 shows the configuration of a mobile communication device to which the biometrics authentication functions of FIG. 1 have been imparted; FIG. 3 shows the configuration of the service area device of FIG. 1; and FIG. 4 shows the configuration of the automated transaction device of FIG. 1. The biometrics authentication system of FIG. 1 is an example of a financial system employing an ATM (Automated Teller Machine) in use by financial organizations.

As shown in FIG. 1, the mobile communication terminal 1 is configured as a portable telephone having functions for contact-free IC card data reading and writing. As explained below using FIG. 2, as this portable telephone, for example, a Felica (a registered trademark)-compatible portable phone is suitable. For example, the F901i (manufactured by Fujitsu Ltd.) of NTT DoCoMo is equipped with FeliCa-compatible i-applications.

A Felica-compatible terminal 2 is configured as automated transaction equipment, explained in FIG. 4. The i-application server 3 communicates with the mobile communication terminal 1 by e-mail, and in response to access by the mobile communication terminal 1, secures a common area for the i-application on the mobile communication terminal 1, and transmits the biometrics authentication application. The bank host 5 is connected to the Felica-compatible terminal 2, and executes transaction processing based on biometrics authentication using the mobile communication terminal 1.

A service area terminal 6A, connected to a biometrics image capture device 10 and a Felica reader/writer 21, is provided in a branch 6 of the financial organization. This biometrics image capture device 10 acquires vein data (for example, of the veins in the palm of the hand or fingers) from the human body as biometrics information. The Felica reader/writer 21 communicates with a Felica chip in the mobile communication terminal 1 to read and write data from and to the mobile communication terminal 1. The service terminal 6A appends an account number and similar to the acquired biometrics information, and registers this information in the mobile communication terminal 1. This service area terminal 6A is connected to the bank host 5 and executes the registration processing.

As shown in FIG. 2, the above-described mobile terminal 1 has a display unit 13, key input unit 14, long-range communication unit (mobile communication unit) 15, CPU 11, memory 12, short-range communication unit (FeliCa chip) 16 with contact-free IC card specifications, and a bus 17 connecting these.

This mobile terminal 1 has mail functions, including a browser, voice phone functions, i-application execution functions, and contact-free IC card functions. The CPU 11 starts these functions in response to key operation of the key input unit 14. Further, the memory 12 has an i-mode (a registered trademark) application program area 12-1, and a common area 12-2 to store an account number for transactions and biometrics information and similar. This common area 12-2 is an authenticated area which can be used by the Felica chip 16, and as explained below, is allocated as an area for use by a biometrics authentication application as a result of request for Felica use.

The service area terminal 6A in FIG. 1 has, as hardware, a CPU unit, keyboard, and display. The service area terminal 6A is connected to a vein sensor 10 as the biometrics image capture unit, and to a Felica reader/writer 21, including an antenna 21A for wireless communication with the Felica chip 16 in the mobile communication terminal 1 and an RF (Radio Frequency) unit 21B.

As shown in FIG. 3, as software the service area terminal 6A further has a Windows (a registered trademark) or other OS (Operating System) 60; a service area processing application 61; package software 62; and middleware 63. The service area terminal 6A further has a vein authentication driver 67 which drives the biometrics image capture unit 10, which here is a vein sensor; a vein authentication library (program) 66, which performs vein authentication processing; a Felica R/W driver 65, which drives the Felica reader/writer 21; and a Felica library (program) 64, which performs processing of data from a Felica chip 16.

As shown in FIG. 4, the automated transaction equipment 2 has a control unit 20, memory (magnetic disk device) 22, customer operation unit 23, card unit 24, cash unit 25, circuit line control unit 26, and biometrics image capture unit 10 (here, a vein sensor). The card unit 24 reads a magnetic card/IC card inserted from a card insertion/ejection aperture (not shown), and returns the card to the insertion/ejection aperture. Further, the card unit 24 optically reads the card (embossed portion) by means of an image sensor. The card unit 24 uses a printing head to print the results of the transaction on a receipt form, and ejects the printed receipt through the card insertion/ejection aperture.

The UOP unit (customer operation unit) 23 includes a display with touch-screen (screen display unit 23-1 and touch-panel for key input 23-2) 23-1, 23-2, a voice guidance unit 23-3, and a customer sensor 23-4.

The cash unit 25 includes a recycling-type paper currency/coin withdrawal/deposit mechanism, which has a paper currency/coin quantity counting portion which validates and counts paper currency/coin inserted from the paper currency/coin insertion/ejection opening; a paper currency storage portion (stacker) to store paper currency/coins; and a unit control portion to perform deposit operations to store counted paper currency/coins in the stacker, and withdrawal operations to pick up the required paper currency/coins from the stacker and discharge the paper currency/coins to the paper currency/coin insertion/ejection opening.

The circuit line control unit 26 exchanges data with the host computer 5 (host of the financial organization) via public circuits or similar 4. The control unit 20 uses programs and data in the memory 22 to control the customer operation unit 23, card unit 24, cash unit 25, and circuit line control unit 26.

Further, the automated transaction equipment 2 has a mobile communication unit 21 which communicates with the mobile communication terminal 1. This mobile communication unit 21 includes the contact-free IC card reader/writer 21 explained in FIG. 3, and is connected to the control unit 20. The software 60 to 67 explained in FIG. 3 is installed in the control unit 20.

In this invention, as indicated in FIG. 1, the vein application is downloaded to the mobile communication terminal 1 from the i-application server 3, and an authenticated biometrics information area is created. The user brings the mobile communication terminal 1 to the service area 6, causes his own biometrics information to be captured in an image, and stores the biometrics data (vein data) and an account number in the common area 12-2 of the mobile communication terminal 1. By this means, the mobile communication terminal 1 has the functions of an individual card storing biometrics information, and issuing of a card for biometrics authentication is completed.

The user causes the mobile communication terminal 1 to be read by the automated transaction equipment 2, performs individual authentication based on biometrics authentication, and executes an automated transaction from the account. Consequently the process of card issuing is simplified, the costs incurred in card issuing can be reduced, and biometrics authentication can be performed.

Processing for Registration in a Mobile Communication Device

Figure 5:
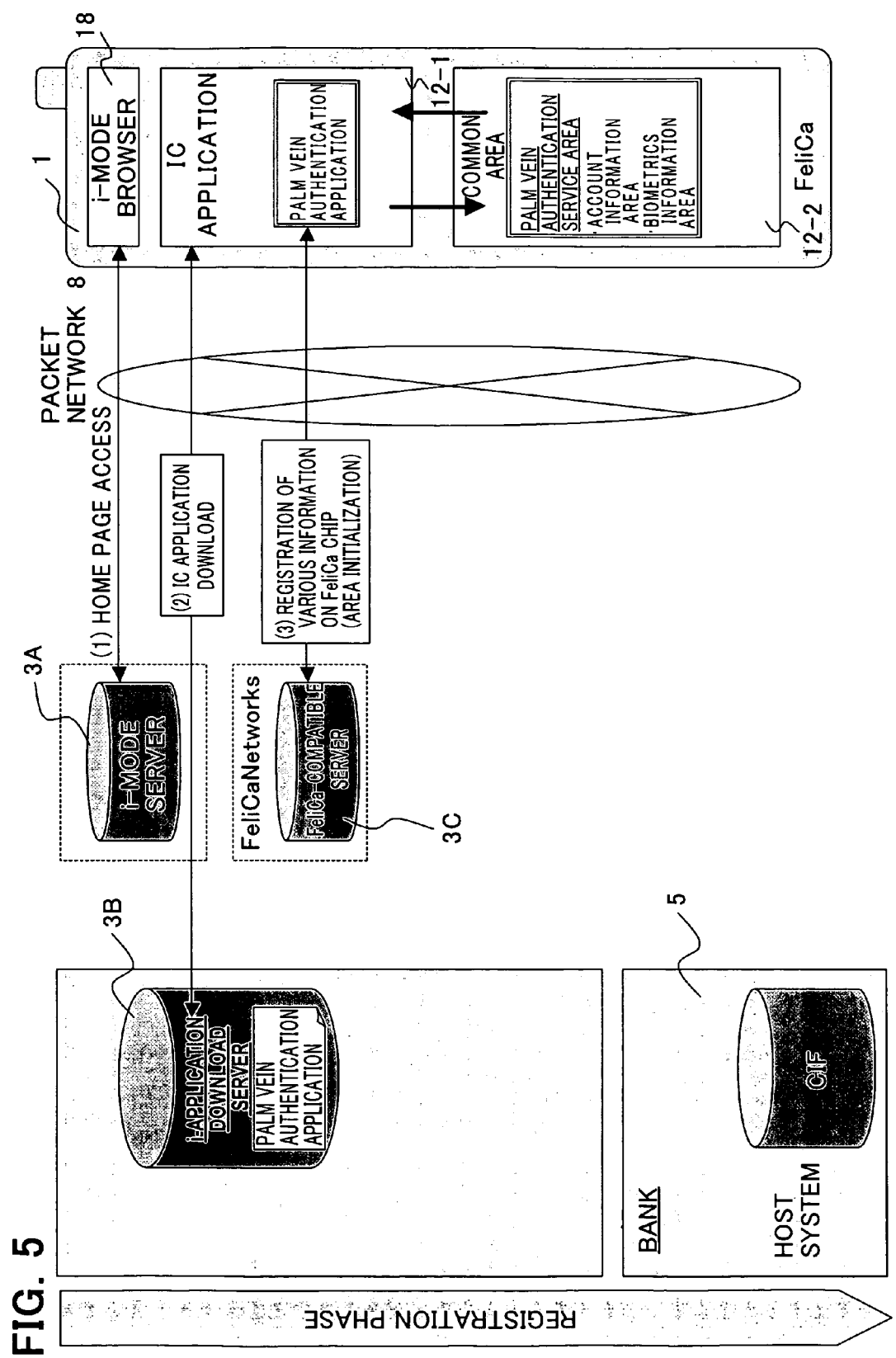
FIG. 5 shows the flow of the registration processing of FIG. 1.
Figure 6:
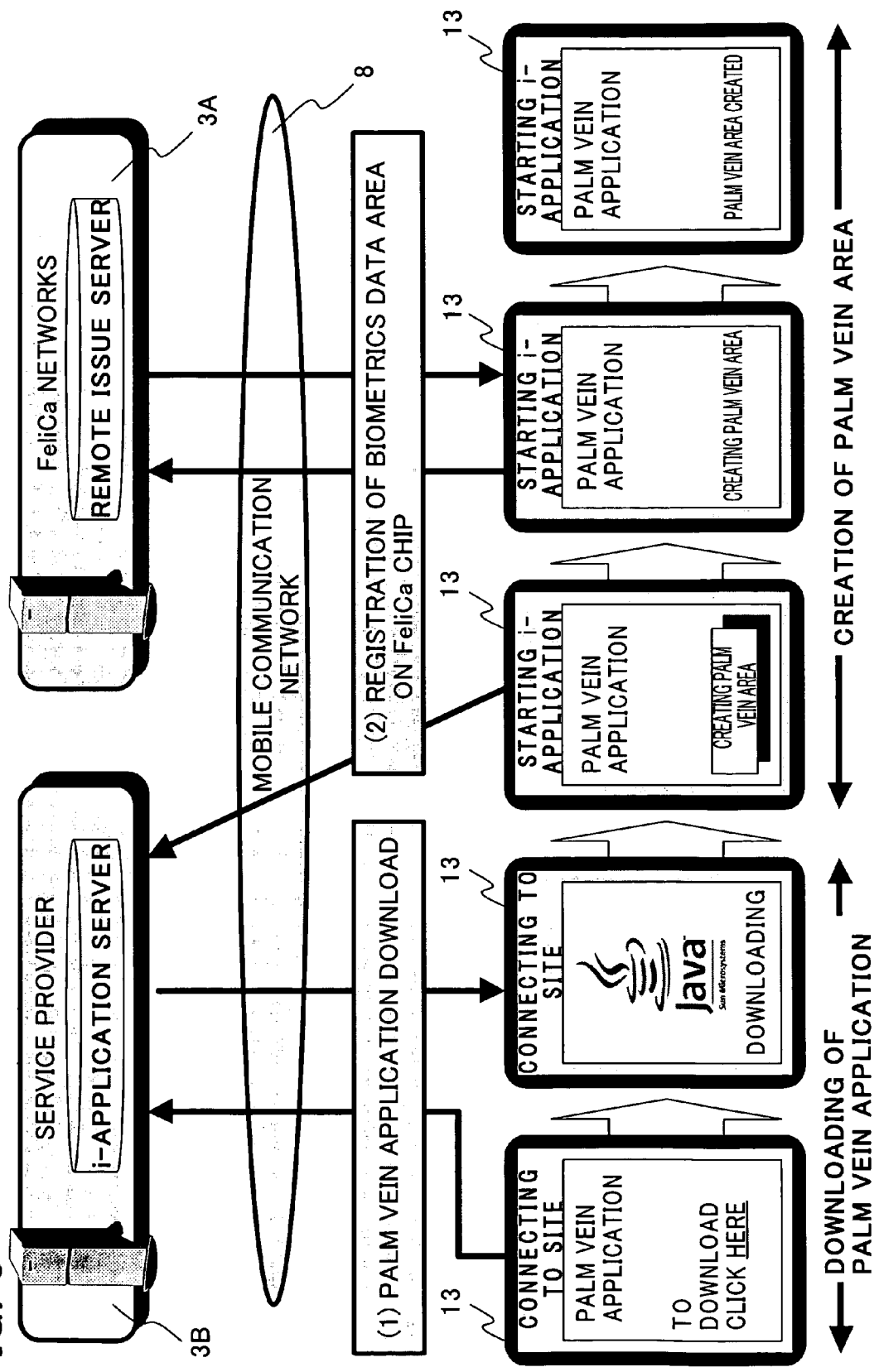
FIG. 6 explains the registration processing of FIG. 5.

FIG. 5 shows the flow of the registration processing in the mobile communication terminal of an embodiment of the invention; FIG. 6 explains this registration processing. As indicated in FIG. 5, the i-application server 3 includes an i-mode server 3A, i-application download server 3B, and Felica-compatible server 3C. First, the vein authentication application is registered in i-application download menu of the i-mode (registered trademark), and a common area 12-2 is secured in the Felica chip 16.

That is, a request is submitted to a service company operating the Felica network, a specific area is allocated in the common area 12-2, and a vein authentication application ID (identifier) is obtained. The Felica service company stores the allocated ID, area, and registration data necessary for initialization on the Felica-compatible server 3C. Further, the vein application is registered as an i-application download menu of the i-mode server 3A.

As indicated in FIG. 5, the user uses an i-mode browser 18 on the mobile communication terminal 1 to access the home page of the i-mode server 3A, thereby the vein authentication application site can be selected as an i-application.

As shown in FIG. 6, the user operates the mobile communication terminal 1 to connect to the download site (i-application download server) 3B for the vein authentication application, then a message indicating connection to the site is displayed on the screen of the display unit 13 of the mobile communication terminal 1. The user operates keys 14 on the mobile communication terminal 1 to cause the vein authentication application to be downloaded to the mobile communication terminal 1 from the i-application server 3B, and the application is stored in the memory 12.

Next, when the user starts the vein authentication application which has been downloaded to the mobile communication terminal 1, connection is made to the Felica-compatible server 3C using an URL embedded in the vein authentication application. The Felica-compatible server 3C transmits to the mobile communication terminal 1 various types of information for registration in the Felica chip 16 (which includes memory 12), according to the above-described allocated ID sent from the mobile communication terminal 1.

The mobile communication terminal 1 receives this, creates a vein authentication service area in the common area 12-2, and registers this area in the Felica chip 16. For example, a screen for the process of creation of a palm vein area such as shown in FIG. 6 is displayed on the display portion 13 of the mobile communication terminal 1, and as indicated in FIG. 5, a vein authentication service area (account area and biometrics information area) is created in the common area 12-2.

Here the palm vein authentication application limits access to areas by means of mutual authentication via the Felica reader/writer 21, and in addition performs reading and writing of the allocated vein authentication service area according to instructions after authentication. Moreover, there is also a function to perform processing as necessary to compare the biometrics information (vein data) registered in the biometrics information area of the common area, described below, with the biometrics information obtained via the Felica reader/writer 21, to perform biometrics authentication.

In this way, the vein authentication application is downloaded from the communication site to the mobile communication terminal 1, and a service area is created in the Felica chip. Access to this service area is limited by the vein authentication application, so that security functions can be provided, and the mobile communication terminal 1 can be provided with the functions of biometrics authentication media. Hence advance preparations to issue a card for biometrics authentication are possible anywhere and at any time, according to operations by the user.

Processing During use of a Mobile Communication Terminal

Figure 7:
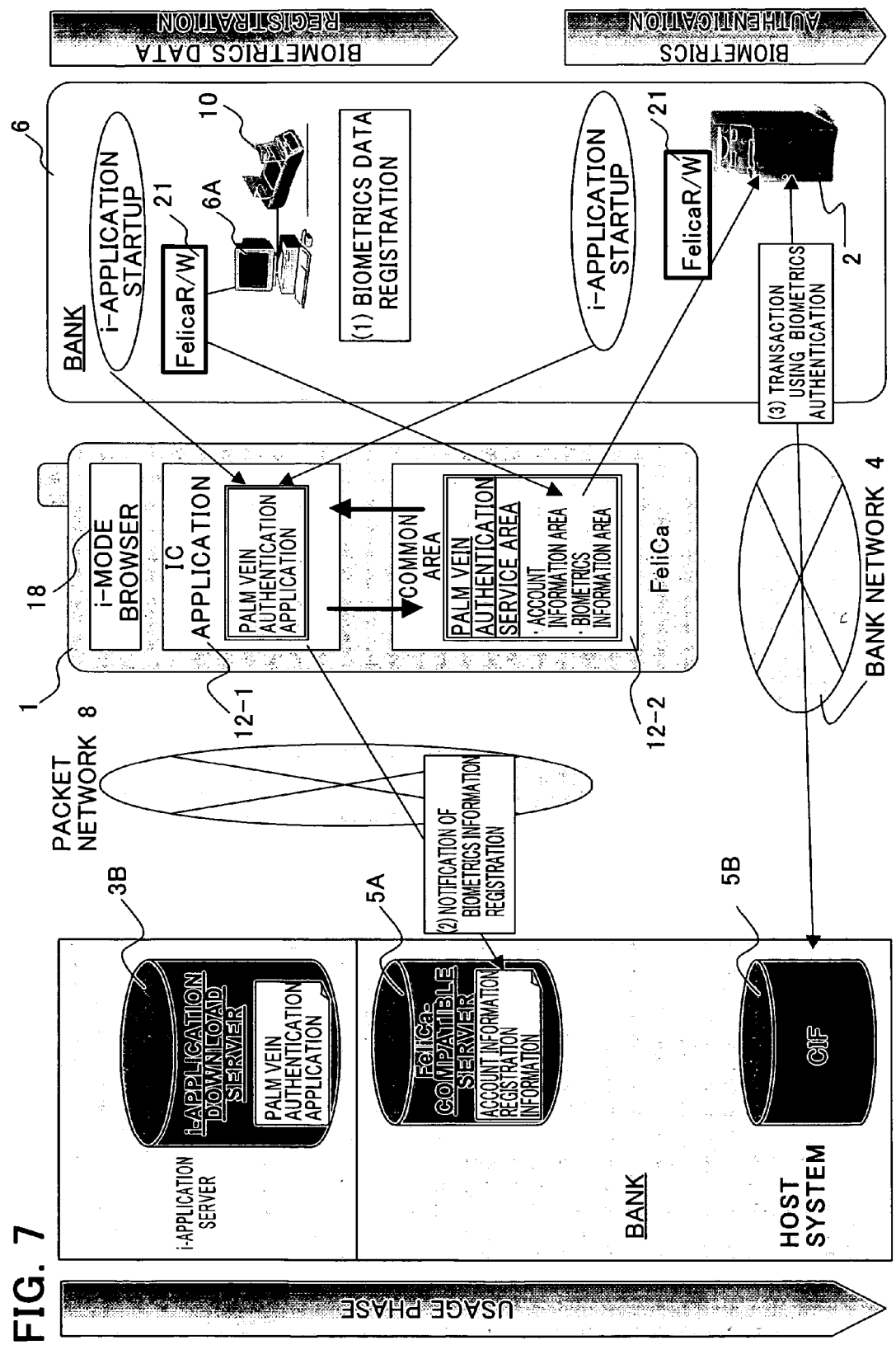
FIG. 7 shows the flow of usage processing of FIG. 1.

Next, processing during use of a mobile communication terminal is explained, using FIG. 7 through FIG. 10. FIG. 7 shows the flow of biometrics data registration processing and biometrics authentication processing of the mobile communication terminal of an embodiment of the invention, and FIG. 8 explains the biometrics data registration processing.

Figure 8:
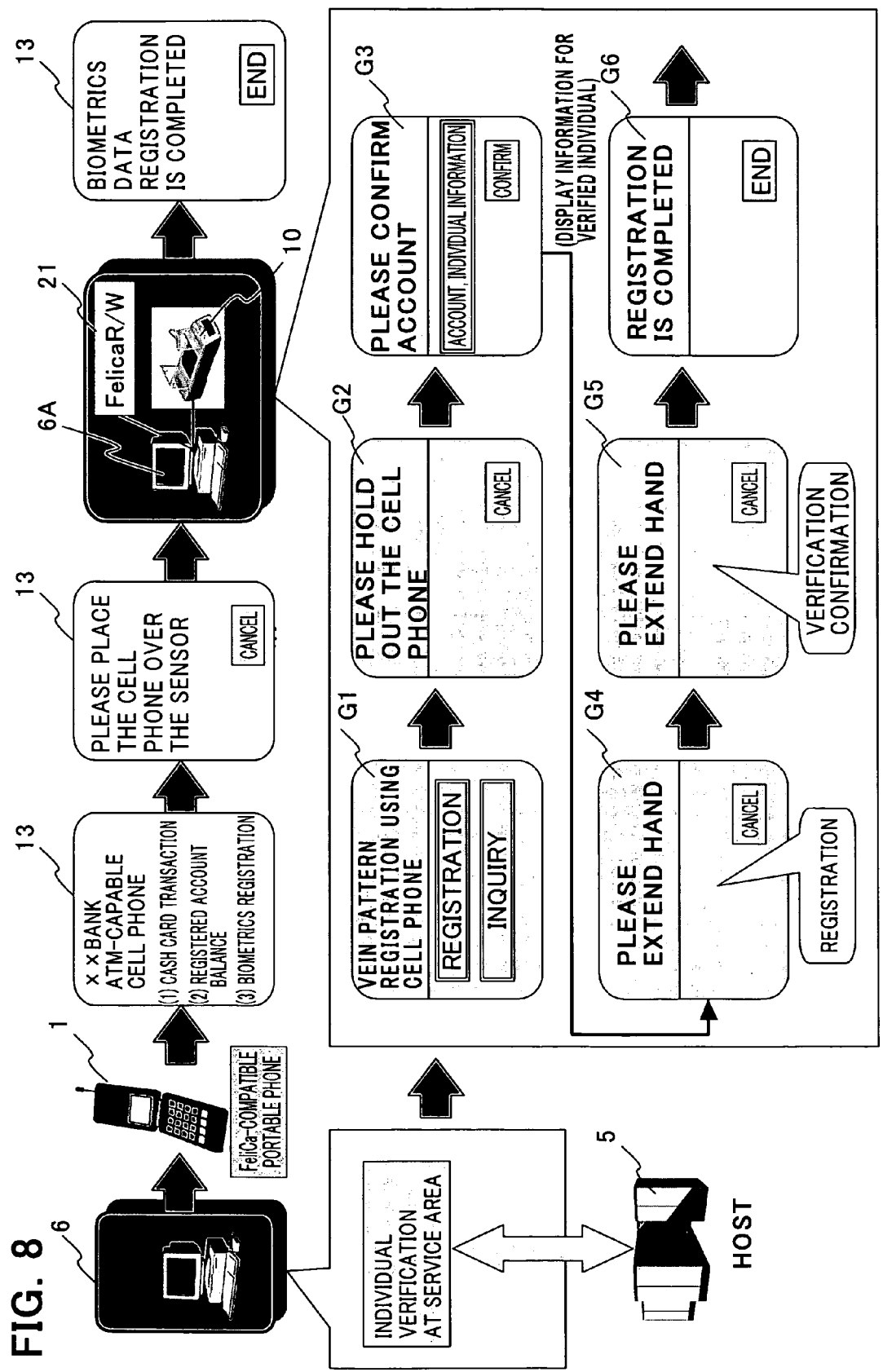
FIG. 8 explains the biometrics information registration processing of FIG. 7.

First, biometrics data registration processing is explained. As shown in FIG. 1, a user carries a mobile communication terminal 1 in which is registered the above-described vein application, and comes to the service area 6 of the bank. As indicated in FIG. 8, the user employs a prescribed form or similar to request an account transaction by portable telephone at the service area 6. At the service area 6, a bank host 5 is queried, and the identity of the individual is verified. For example, the user may fill in a form with his name, date of birth, address, phone number, portable phone number, account number, seal or password number, and similar, and present the form to the service area personnel. At the service area, the bank host 5 is queried using this information, to determine whether the individual is in fact the owner of the account with this information. The portable phone number is confirmed while at the service area.

Upon confirmation of his identity, the user places his portable phone with contact-free IC functions (for example, Felica functions) 1 over the Felica reader/writer 21 of the service area terminal 6A. The service area terminal 6A uses the Felica library 64 to authenticate and be authenticated by the portable phone 1, and when the result of the mutual authentication is satisfactory, the i-application of the portable phone 1 is started. As indicated in FIG. 7, by this means the vein authentication application of the portable phone 1 is started. A selection screen titled "XX Bank ATM-capable Cell Phone" shown in FIG. 8 is displayed on the display unit 13 of the portable phone 1. Here, "Cash card transaction", "Registered account balance", and "Biometrics registration" are displayed on the selection menu.

When the user selects "Biometrics registration" on this screen, the "Please place the cell phone over the sensor" guidance screen in FIG. 8 is displayed on the display unit 13 of the portable phone 1. At this screen, cancellation of the selected item can be selected.

On the other hand, a "Vein pattern registration using cell phone" screen G1 in FIG. 8 is displayed on the service area terminal 6A in response to selection of biometrics registration. At this screen G1, "Registration" and "Inquiry" can be selected. When the user selects registration at this screen G1, the "Please place the cell phone over the sensor" guidance screen G2 in FIG. 8 is displayed. At this screen, cancellation of the selected item can be selected.

Next, the account confirmation screen G3 is displayed at the service area terminal 6A. This screen G3 displays the account number and individual information previously verified for the individual. At this screen G3, upon pressing a "Confirm" button, the service terminal 6A displays the palm vein pattern reading guidance screen G4. In response, the user extends his palm over the vein sensor 10. The vein sensor 10 reads an image of the veins in the palm of the hand, and sends the read image to the vein authentication library 66 of the service area terminal 6A. The vein authentication library 66 extracts vein pattern characteristics from the vein image, and creates biometrics data (vein data).

Further, the service area terminal 6A writes this vein data and the account data and similar to the common area 12-2 managed by the vein authentication application of the portable phone 1 using the Felica reader/writer 21, via the Felica library 64. Test authentication is then performed. That is, the service area terminal 6A again displays a guidance screen G5 for reading of the vein pattern in the palm of the hand. In response, the user extends the palm of his hand over the vein sensor 10. The vein sensor 10 reads the vein image of the palm, and sends this to the vein authentication library 66 of the service area terminal 6A. The vein authentication library 66 extracts the vein pattern characteristics from the vein image, and creates biometrics data (vein data).

On the other hand, the service area terminal 6A uses the Felica reader/writer 21 to read vein data registered in the common area 12-2 of the portable phone 1 via the Felica library 64, and uses the vein authentication library 66 to verify the re-read vein data against the registered vein data to confirm verification. Or, the vein data thus read is sent to the vein authentication application of the portable phone, and verification confirmation is performed within the phone. If the verification result is satisfactory, the service area terminal 6A displays a registration completion screen G6, and a registration completion screen is also displayed on the display unit 13 of the portable phone 1.

Upon this completion of registration, as shown in FIG. 7, the vein authentication application of the portable phone 1 notifies the Felica-compatible server 5A of the financial organization, via the mobile communication network 8, of registration of biometrics information. That is, the account information and registration information are stored in the Felica-compatible server 5A.

In this way, biometrics information is registered in the portable phone 1, and transactions based on biometrics authentication are made possible.

Figure 9:
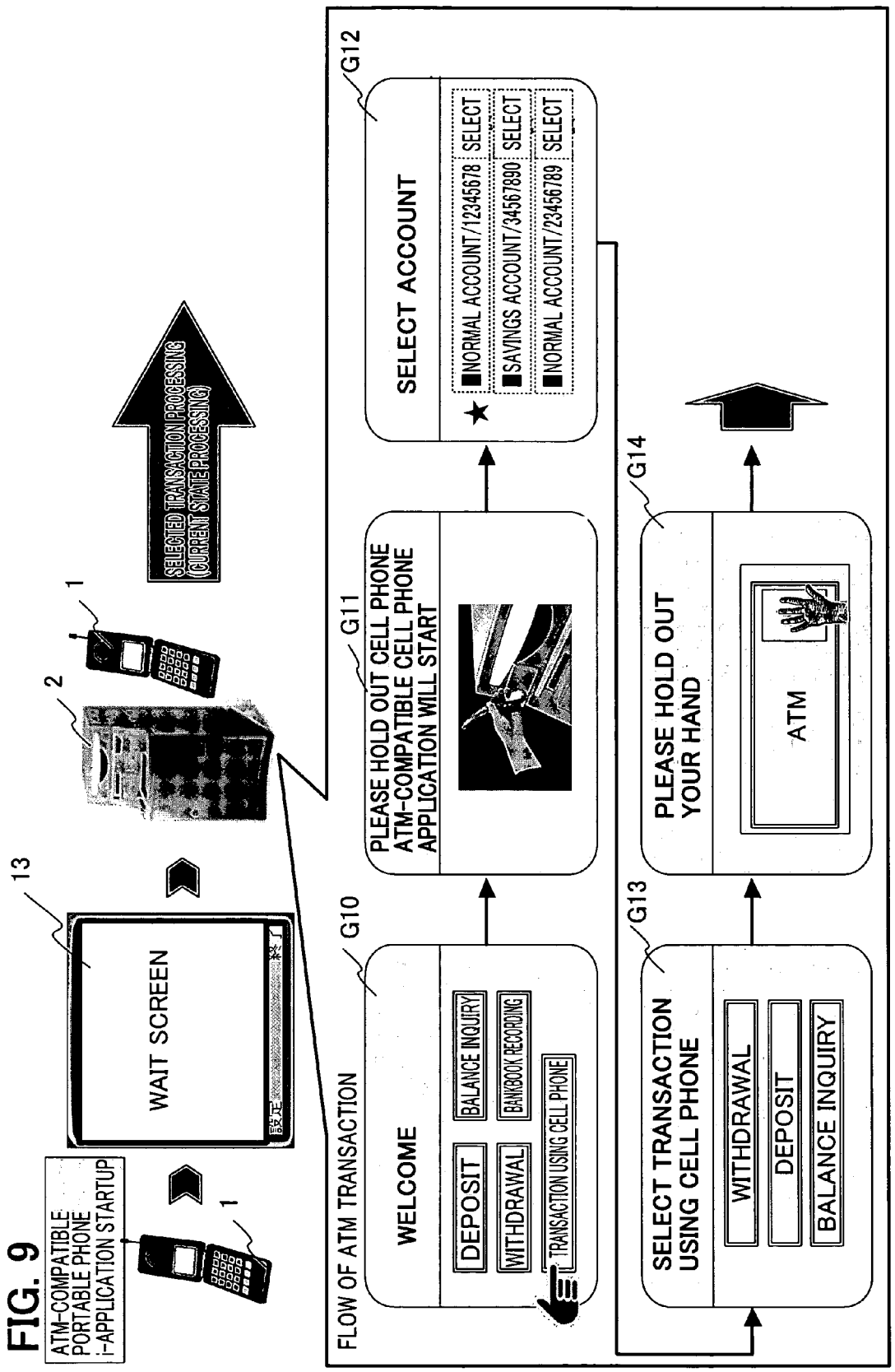
FIG. 9 shows the flow of biometrics authentication processing of FIG. 7.
Figure 10:
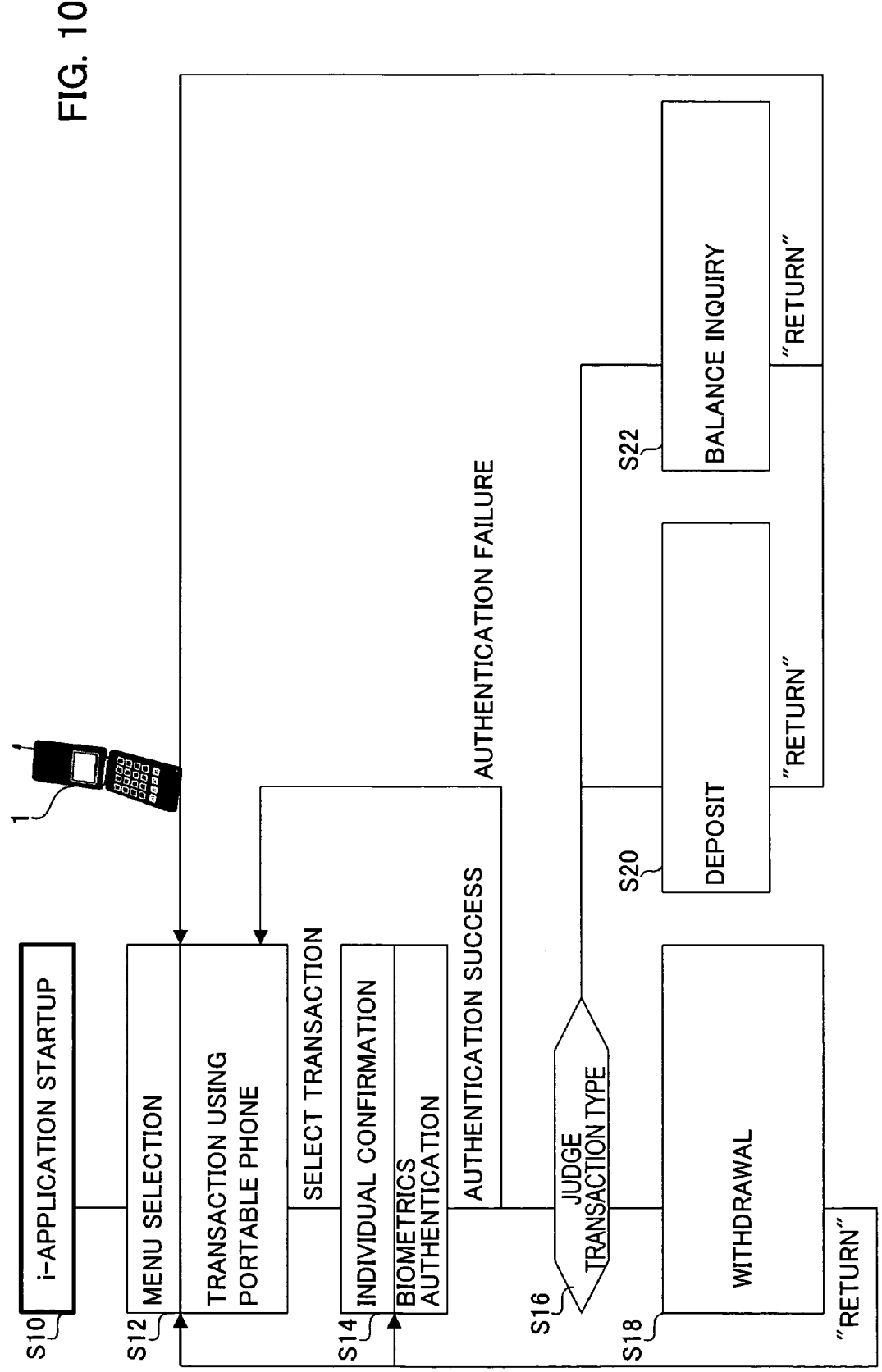
FIG. 10 is a flowchart of the biometrics authentication processing of FIG. 9.

Next, FIG. 9 and FIG. 10 are used to explain biometrics authentication processing.

(S10) As shown in FIG. 10, when the user presses an i-application key using the key input unit 14 of the mobile terminal 1, the CPU 11 starts the i-application, and an i-application wait screen is displayed on the display unit 13. Also, the automated transaction equipment 2 displays, on the customer operation unit 23 as the transaction selection screen G10, the selection icons "Deposit", "Withdrawal", "Balance inquiry" and "Bankbook recording", which are normal card transactions, as well as "Transaction using cell phone", which is a transaction using the portable phone.

(S12) When the user selects "Transaction using cell phone" at the displayed transaction selection screen G10, the automated transaction equipment 2 displays a guidance screen G11 on the customer operation unit 23 instructing the user to place the portable phone over the Felica sensor 21. The user places the short-range communication unit 16 of the portable phone 1 over the mobile communication unit 21 of the ATM 2, whereupon the above-described account number, biometrics information and similar is communicated by contact-free means to the mobile communication unit 21 of the ATM 2 from the short-range communication unit 16, by a well-known read/write sequence of a contact-free IC card. Upon receiving this, the ATM 2 displays the account selection screen G12 on the customer operation unit 23. This account selection screen G12 provides the account numbers transmitted from the portable phone 1. The user selects the account number for the transaction from the customer operation unit 23, whereupon a portable phone transaction selection screen G13 is displayed on the customer operation unit 23. This transaction selection screen G13 displays only those transactions which can be performed automatically using the portable phone 1. Here, only "Withdrawal", "Deposit", and "Balance inquiry" can be selected.

(S14) When the user selects a transaction item using the customer operation portion 23, the ATM 2 displays a palm vein reading guidance screen G14 on the customer operation unit 23. In response, the user extends the palm of his hand over the vein sensor 10. The vein sensor 10 reads the vein image of the palm, and sends the data to the vein authentication library 66 of the ATM 2. The vein authentication library 66 extracts the vein pattern characteristics from the vein image, and creates biometrics data (vein data). The vein authentication library 66 of the ATM 2 then verifies the read-out vein data against the vein data registered in the portable phone 1, and confirms verification. If the authentication fails (is unsuccessful), a retry operation is performed; if authentication is not successful even after a prescribed number of retries, the service processing ends, and blockage of service processing is performed.

(S16) If on the other hand the authentication is successful, the ATM 2 judges the transaction selection made in step S12 using the portable phone.

(S18) The ATM 2 executes well-known withdrawal processing in response to a withdrawal selection. For example, a screen requesting input of the amount for withdrawal is displayed on the screen 23-1 of the customer operation unit 23, the user inputs an amount, and upon detection of the end of the input process, an amount confirmation screen is displayed on the screen 23-1 of the customer operation unit 23. The control unit 20 detects the pressing of the confirmation key, and displays a screen indicating communication with a computer on the screen 23-1 of the customer operation unit 23.

During this time, the control unit 20 transmits the selected account data and amount for withdrawal to the host computer 5 via the circuit line control unit 26, and obtains a response from the host computer 5. The control unit 20, upon obtaining a response from the host computer 5 permitting withdrawal, issues a receipt from the card unit 24 if an instruction has been given to issue a receipt. The control unit 20 then instructs the cash unit 25 to dispense cash in the amount input. The cash unit 25 dispenses cash (paper currency) in the amount specified, whereupon the control unit 20 displays a paper currency dispensed screen on the screen 23-1 of the customer operation unit 23. The control unit 20, upon detecting removal of the cash, displays a transaction completed screen on the screen 23-1 of the customer operation unit 23. Processing then returns to step S12.

(S20) When a deposit transaction is selected in step S12, the control unit 20 displays a cash (paper currency) insertion screen on the screen 23-1 of the customer operation portion 23. An "Insert bills" guidance message is displayed on this screen. The control unit 20 leaves open the insertion opening of the cash unit 25. When the control unit 20 detects the insertion of paper currency into the insertion opening of the cash unit 25, a screen indicating that paper currency is being counted is displayed on the screen 23-1 of the customer operation unit 23. During this period, the cash unit 25 counts the inserted paper currency.

Upon receiving notification of the completion of counting from the cash unit 25, the control unit 20 displays an amount confirmation screen on the screen 23-1 of the customer operation unit 23. In this screen, the counted amount of money and a confirmation key are displayed. Upon detecting depression of the confirmation key, the control unit 20 displays a screen indicating communication with the computer on the screen 23-1 of the customer operation unit 23. During this time, the control unit 20 transmits the selected account data and the counted amount of money to the host computer 5 via the circuit line control unit 26, and obtains a response from the host computer 5.

If the response from the host computer 5 indicates that a deposit is permitted, when issuing of a receipt has been specified, the control unit 20 issues a receipt through the card unit 24. The control unit 20 then displays a receipt issuing screen on the screen 23-1 of the customer operation unit 23. This screen displays a "Please take your receipt" guidance message. Upon detecting that the receipt has been taken, the control unit 20 displays a transaction completed screen on the screen 23-1 of the customer operation unit 23. Processing then returns to step S12.

(S22) If in step S12 balance inquiry is selected, the control unit 20 displays a screen indicating communication with the computer on the screen 23-1 of the customer operation unit 23. During this time, the control unit 20 transmits the selected account data to the host computer 5 via the circuit line control unit 26, and obtains a response from the host computer 5. Upon receiving a response from the host computer 5, the control unit 20 displays a balance confirmation screen on the screen 23-1 of the customer operation unit 23. In this screen, the "account number", "account balance", and a confirmation key are displayed. Upon depression of the confirmation key, if issuing of a receipt has been specified, the control unit 20 causes the card unit 24 to print and issue a receipt. The control unit 20 then displays a receipt issued screen on the screen 23-1 of the customer operation unit 23. Upon detecting removal of the receipt, the control unit 20 displays a transaction completed screen on the screen 23-1 of the customer operation unit 23. Processing then returns to step S12.

In this way, biometrics data is read from the portable telephone 1, biometrics authentication is performed, and account data is used to execute a normal automated transaction. In this case, because the transaction service is requested from a mobile terminal, transaction types are limited to "Withdrawal", "Deposit", and "Balance inquiry". By this means, an excessive number of transaction items are not displayed, for convenience to the user.

As indicated in screen G12 of FIG. 9, the mobile terminal 1 can have data for a plurality of accounts, so that the user need not carry cards for each account. That is, a plurality of cards can be combined, to provide better service to the user.

As a biometrics authentication method suited for use with mobile terminals, in addition to fingerprint authentication, methods of authentication using the blood vessel images of the fingers, blood vessel images of the palms, palm-prints, and similar are appropriate.

Other Embodiments

Figure 11:
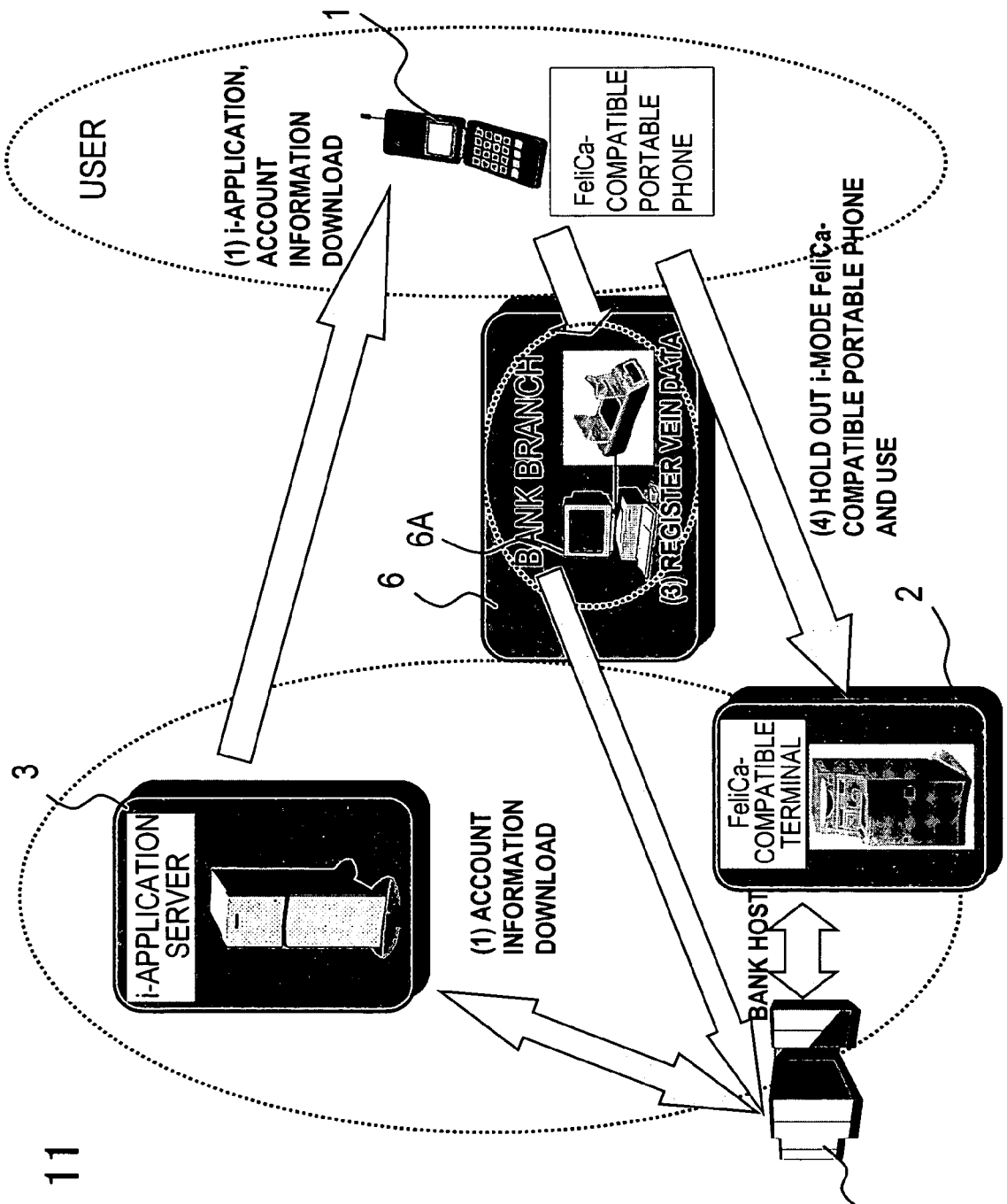
FIG. 11 shows the configuration of the biometrics authentication system of another embodiment of the invention.

FIG. 11 is a block diagram of the system of another embodiment of the invention. In FIG. 11, portions similar to those shown in FIG. 1 are assigned the same symbols. Here, the account numbers and similar of a user from whom there has been a request for use are downloaded to an i-application server 3 from a bank host 5. A vein application and account numbers are downloaded from the i-application server 3 to the mobile communication terminal 1, an authenticated biometrics information area is created, and account numbers are stored. The user brings this mobile communication terminal 1 to the service area 6, and causes his own biometrics image information to be captured; the biometrics data (vein data) is stored in a common area 12-2 of the mobile communication terminal 1. In this way, the mobile communication terminal 1 has the functions of an individual card storing biometrics information, and issuing of a card for biometrics authentication is completed.

The user causes the mobile communication terminal 1 to be read by the automated transaction equipment 2, individual authentication based on biometrics authentication is performed, and an automated transaction is executed for the account. Thus the process of card issue can be simplified, and issuing-related costs can be reduced while enabling biometrics authentication.

In the above-described embodiments, the case of biometrics authentication through authentication of the vein patterns of the palm of a hand was explained; but application to biometrics authentication using the vein patterns of fingers, fingerprints, blood vessel patterns in the back of the hand, palm-prints, facial features, and similar is possible. Also, automated transaction equipment for financial services was explained, but application to automated ticket issuing equipment, automated vending equipment, and automated equipment in other fields is also possible.

The contact-free communication method of the mobile terminal 1 was assumed to be the Felica system in the explanation; but other IC card contact-free communication methods, or other contact-free communication methods, such as communication by infrared rays or similar, can be employed. Similarly, the example of a portable phone as the mobile terminal was explained; but a PDA (Personal Digital Assistant) or other mobile communication terminal can be used.

By causing a biometrics authentication application to be downloaded from a server to a mobile communication terminal, causing an area for authenticated biometrics information to be created, and storing biometrics data (vein data) captured as an image of the body of the user himself as well as account numbers in a common area of the mobile communication terminal, the mobile communication terminal can be provided with the functions of an individual card storing biometrics information, to complete issuing of a card for biometrics authentication. As a result the process of card issuing can be simplified, and the costs of card issuing can also be reduced.

What is claimed is:
1. A biometrics authentication method, comprising the steps of:
accessing, from a mobile communication terminal having contact-free communication functions and mobile communication functions, a server which manages a biometrics authentication application, via a mobile communication network by said mobile communication functions;
downloading, from the server to the mobile communication terminal, the biometrics authentication application, which limits read and write access of storage area of a memory in said mobile communication terminal;
second accessing, from said mobile communication terminal, a second server by URL (Uniform Resource Locator) information embedded in said biometrics authentication application;
second downloading, from the second server, specification of said storage area to the mobile communication terminal to be managed by the biometrics authentication application;
creating the storage area to store biometrics information in said memory of the mobile communication terminal according to the storage area specification;
first communicating the mobile communication terminal with a sensor unit for detecting the biometrics information of a user from the user of the mobile communication terminal by said contact-free functions of said mobile communication terminal;
authorizing an access of said sensor unit by said first communication of said contact-free functions by the biometrics authentication application;
writing the biometrics information which is detected by said sensor unit to said storage area of the mobile communication terminal, said storage area is managed by the biometrics authentication application, when said biometric authentication application authorizes the access of said sensor unit;
second communicating the mobile communication terminal with a service terminal which detects the biometrics information of the user, in use of the contact-free communication functions of the mobile communication terminal;
obtaining, by said service terminal, said biometrics information written in the storage area of the mobile communication terminal when said biometric authentication application authorizes an access of said service terminal by said communicating of said contact-free functions;
verifying, by said service terminal, the biometrics information detected by the service terminal against the biometrics information written in the mobile communication terminal; and
performing transaction processing of account information read from the memory of the mobile communication terminal, at the service terminal, when the verification is satisfactory, in use of the contact-free communication functions of the mobile communication terminal,
wherein further comprises:
displaying that said biometrics authentication application has completed to create said storage area in said memory, on a screen of the mobile communication terminal to notify a completion of a preparation to write the biometrics information;
selecting registration from a selection screen of the mobile communication terminal created by the biometrics authentication application after the displaying;
starting the first communication by said biometrics authentication application in response to a selection of the registration; and
starting the second communication by said biometrics authentication application in response to a selection of a transaction with the mobile communication terminal on the service terminal.

2. The biometrics authentication method according to claim 1, wherein said writing comprises a step of writing the biometrics information, and individual information of the user to enable use of the biometrics authentication application.

3. The biometrics authentication method according to claim 2, wherein said writing comprises a step of writing the biometrics information, and said account information of the user to enable use of the biometrics authentication application.

4. The biometrics authentication method according to claim 1, wherein said second downloading comprises a step of downloading individual information of the user to enable use of the biometrics authentication application.

5. The biometrics authentication method according to claim 4, wherein said second downloading comprises a step of downloading the account information of the user to enable use of the biometrics authentication application.

6. A biometrics authentication system, comprising:
a server, which is accessed via a mobile communication network by a mobile communication terminal having contact-free communication functions and mobile communication functions, and which transmits a biometrics authentication application, which limits read and write access of storage area of a memory in said mobile communication terminal, to the mobile communication terminal via said mobile communication network according to said access which uses said mobile communication functions from said mobile communication terminal;
a registration terminal, which detects biometrics information of a user from the user of the mobile communication terminal, executes a contact-free communication with the mobile communication terminal to which the biometrics authentication application has been transmitted, and writes, in storage area managed by the biometrics authentication application of the mobile communication terminal, the detected biometrics information when said biometric authentication application authorizes an access of said registration terminal by said contact-free communication; and
a verification device, which detects biometrics information of the user, executes a contact-free communication with the mobile communication terminal by the contact-free communication functions of the mobile communication terminal, and verifies the detected biometrics information against the biometrics information written to the mobile communication terminal when said biometric authentication application authorizes an access of said verification device by said contact-free communication, and performs transaction processing of account information read from the memory of the mobile communication terminal, when the verification is satisfactory, in use of the contact-free communication functions of the mobile communication terminal,
wherein the biometrics authentication system further comprises a second server that transmits a specification of said storage area managed by said biometrics authentication application to said mobile communication terminal according to access by URL (Uniform Resource Locator) information embedded in said biometrics authentication application from said mobile communication terminal, and
said mobile communication terminal creates said storage area of said biometrics information in the memory of the mobile communication terminal,
and wherein said biometrics authentication application of said mobile communication terminal displays that said biometrics authentication application has completed to create said storage area in said memory, on a screen of the mobile communication terminal to notify a completion of a preparation to write the biometrics information, creates a selection screen for selecting registration from the selection screen of the mobile communication terminal created by the biometrics authentication application after the displaying, starts the contact-free communication with said registration terminal in response to a selection of the registration and starts the contact-free communication with the verification device in response to a selection of a transaction with the mobile communication terminal on the verification device.

7. The biometrics authentication system according to claim 6, wherein the registration terminal writes the biometrics information, and individual information of the user to enable use of the biometrics authentication application to the mobile communication terminal.

8. The biometrics authentication system according to claim 7, wherein the registration terminal writes the biometrics information, and said account information of the user to enable use of the biometrics authentication application in the mobile communication terminal.

9. The biometrics authentication system according to claim 6, wherein the second server transmits individual information of the user to enable use of the biometrics authentication application to the mobile communication terminal.

10. The biometrics authentication system according to claim 9, wherein the second server transmits said account information of the user to enable use of the biometrics authentication application to the mobile communication terminal.

11. A biometrics authentication system, comprising:
a mobile communication terminal, having contact-free communication functions and mobile communication functions, which accesses a server, which manages a biometrics authentication application via a mobile communication network, and receives the biometrics authentication application which limits read and write access of storage area of a memory in said mobile communication terminal by said mobile communication functions;
a biometrics information registration device, which detects biometrics information of a user of the mobile communication terminal from the user, executes a contact-free communication with the mobile communication terminal to which the biometrics authentication application has been received and writes, in said storage area managed by the biometrics authentication application of the mobile communication terminal, the detected biometrics information when said biometric authentication application authorizes an access of said biometrics information registration device by said contact-free communication; and
a service terminal device, which detects biometrics information of the user, executes a contact-free communication with the mobile communication terminal by the contact-free communication functions of the mobile communication terminal, verifies the detected biometrics information against the biometrics information written to the mobile communication terminal when said biometric authentication application authorizes an access of said service terminal device by said contact-free communication and performs transaction processing of account information read from the memory of the mobile communication terminal, when the verification is satisfactory, in use of the contact-free communication functions of the mobile communication terminal,
wherein said mobile communication terminal accesses a second server URL (Uniform Resource Locator) information embedded in said biometrics authentication application, receives a specification of said storage area managed by said biometrics authentication application from said second server, and creates said storage area of said biometrics information, in the memory of the mobile communication terminal, and wherein said biometrics authentication application of said mobile communication terminal displays that said biometrics authentication application has completed to create said storage area in said memory, on a screen of the mobile communication terminal to notify a completion of a preparation to write the biometrics information, creates a selection screen for selecting registration after the displaying, starts the contact-free communication with said biometrics information registration device in response to a selection of the registration, and starts the contact-free communication with the service terminal device in response to a selection of a transaction with the mobile communication terminal on the service terminal device.

12. The biometrics authentication system according to claim 11, wherein the biometrics authentication registration device writes, to the mobile communication terminal, the biometrics information and individual information of the user to enable use of the biometrics authentication application.

13. The biometrics authentication system according to claim 11, wherein the mobile communication terminal is downloaded, from the second server, individual information of the user to enable use of the biometrics authentication application.

14. A biometrics authentication method, comprising the steps of:

accessing, from a mobile communication terminal having contact-free communication functions and mobile communication functions, a server which manages a biometrics authentication application, via a mobile communication network by said mobile communication functions;

downloading, from the server to the mobile communication terminal, the biometrics authentication application, which limits read and write access of storage area of a memory in said mobile communication terminal and specification of said storage area to the mobile communication terminal to be managed by the biometrics authentication application;

creating the storage area to store biometrics information in said memory of the mobile communication terminal according to the storage area specification;

displaying that said biometrics authentication application has completed to create said storage area in said memory, on a screen of the mobile communication terminal to notify a completion of a preparation to write the biometrics information;

selecting registration from a selection screen of the mobile communication terminal, said selection screen is created by the biometrics authentication application after displaying;

first communicating the mobile communication terminal with a sensor unit for detecting biometrics information of a user from the user of the mobile communication terminal by said contact-free functions of said mobile communication terminal in response to a selection of the registration;

writing the biometrics information which is detected by said sensor unit to said storage area of the mobile communication terminal managed by the biometrics authentication application when said biometric authentication application authorizes an access of said sensor unit by said communicating of said contact-free functions;

second communicating the mobile communication terminal with a service terminal which detects the biometrics information of the user, in use of the contact-free communication functions of the mobile communication terminal, in response to a selection of a transaction of the mobile communication terminal at the service terminal;

verifying, by said service terminal, the biometrics information detected by the service terminal against the biometrics information written to the mobile communication terminal when said biometric authentication application authorizes an access of said service terminal by said communicating of said contact-free functions; and performing transaction processing of account information read from the memory of the mobile communication terminal, at the service terminal, when the verification is satisfactory, in use of the contact-free communication functions of the mobile communication terminal.

15. A biometrics authentication system, comprising:

a mobile communication terminal, having contact-free communication functions and mobile communication functions, which accesses a server via a mobile communication network, and receives a biometrics authentication application which limits read and write access of storage area of a memory in said mobile communication terminal by said mobile communication functions;

a biometrics information registration device, which detects biometrics information of a user of the mobile communication terminal from the user, executes a contact-free communication with the mobile communication terminal to which the biometrics authentication application has been downloaded, and writes, in said storage area managed by the biometrics authentication application of the mobile communication terminal, the detected biometrics information when said biometric authentication application authorizes an access of said biometrics information registration device by said contact-free communication; and a service terminal device, which detects biometrics information of the user, executes a contact-free communication with the mobile communication terminal by the contact-free communication functions of the mobile communication terminal and performs transaction processing of account information read from the memory of the mobile communication terminal, when a verification is satisfactory, in use of the contact-free communication functions of the mobile communication terminal, wherein said service terminal device verifies the detected biometrics information against the biometrics information written to the mobile communication terminal when said biometric authentication application authorizes an access of said service terminal device by said contact-free communication, wherein said biometrics authentication application of said mobile communication terminal displays that said biometrics authentication application has completed to create said storage area in said memory, on a screen of the mobile communication terminal to notify a completion of a preparation to write the biometrics information; creates a selection screen for selecting registration, starts the contact-free communication with said biometrics information registration device in response to a selection of the registration, and starts the contact-free communication with the service terminal device in response to a selection of a transaction of the mobile communication terminal at the service terminal.

* * * * *